Patented Nov. 5, 1935

2,020,267

UNITED STATES PATENT OFFICE 2,020,267

ANTIANEMIC SUBSTANCE AND PROCESS OF MAKING IT

George B. Walden, Indianapolis, Ind., assignor to Eli Lilly and Company, Indianapolis, Ind., a corporation of Indiana No Drawing. Application March 17, 1933,
Serial No. 661,356

13 Claims.  (Cl. 167—74)

It is the object of my invention to obtain a potent anti-anemia substance in concentrated form.

It is known (Minot and Murphy, Whipple, and others) that whole liver and kidney are effective in the treatment of anemias generally, both secondary anemia and pernicious anemia. It is also known (Cohn, Campbell, Walden) that certain fractions of these tissues are obtainable that are effective respectively in the treatment of secondary anemia and of pernicious anemia. It is also known (Sturgis and Isaacs) that whole stomachs and stomach linings are effective in the treatment of anemia, and more particularly pernicious anemia.

Further, it is known (Castle) that beef muscles and stomach secretions are not effective separately in the treatment of pernicious anemia, but that a product obtained by mixing beef muscle and stomach secretions and digesting the mixture at an appropriate hydrogen ion concentration is effective in such treatment, whether such digestion is carried on externally of the patient's body on an externally made mixture of such muscle and such stomach secretions, or is carried on within the patient's stomach on a mixture resulting upon separate feeding of such muscle and such stomach secretions simultaneously or sufficiently nearly simultaneously so that interaction occurs between the muscle and the secretions. These things are described by Castle in an article in the American Journal of Medical Sciences for December, 1929. It had earlier been reported by Castle at the meeting of the American Society for Clinical Investigation at Washington on April 30, 1928, that beef muscle ground up and fed to a normal person, and allowed to digest in the stomach of that person for a few hours, could then be removed from the stomach of that person and was effective by oral administration in the treatment of pernicious-anemia patients. It was also shown by Castle that stomach secretions, orally administered alone, are not effective in the treatment of pernicious anemia; and that a treatment is not effective in relieving pernicious anemia if stomach secretions and beef muscle are orally administered to the patient at sufficiently widely separated times to permit the material first so administered to leave the stomach before the second is administered, as for instance by administration of one early in the morning and of the other in the afternoon.

The use of stomachs as a digestive has also long been known. For example, the original commercial pepsin was merely the dried lining or mucous membrane of the stomach. See Thorpe's Dictionary of Applied Chemistry, (1913), vol. 4, p. 112; and Supplemental to American Dispensatory, (15th edition, 1886,) by John King and John U. Lloyd, p. 120. These mere dried stomach-linings, sometimes defatted, which constituted original commercial pepsin, are now known to be effective by oral administration in the treatment of pernicious anemia. The ordinary present-day commercial pepsin (of the United States Pharmacopoeia), however, is not the mere dried lining or mucous membrane of the stomach; but is a water-soluble product derived from the mucous membrane, by fluid-extraction after autolysis, to contain in a more concentrated and purified form the proteolytic enzyme, itself also called pepsin, which digests egg-white under acid conditions and has little or no activity at neutrality. It has been shown that such present-day commercial pepsin is not only not effective itself to relieve pernicious anemia but cannot be substituted for stomach secretions to co-operate with beef muscle to produce a product which is effective in the treatment of pernicious anemia. (Castle, Wilkinson.)

In my Patent No. 1,894,247, granted January 10, 1933, I have described a potent anti-anemia substance consisting of a mixture of certain stomach-tissue material with tissue material of the class comprising liver and kidney, preferably digested extracorporeally to permit the interaction of the ingredients.

I have also discovered that it is possible to get a highly effective and highly concentrated activated anti-anemia substance by appropriate treatment of certain stomach-tissue material alone. That is, using only such stomach-tissue material, I am able to activate it so that I get therefrom an anti-anemia product which is more effective, often from three to twelve times, than any single-tissue-derived material previously known, compared on the basis of the weight of the original tissue employed; and since, as shown by the reported work of various investigators, including Conner (Jour. A. M. A., February 14, 1931, pp. 500–503,) and Sharp, Sturgis, and Isaacs (U. S. Patent No. 1,937,133) prior stomach-tissue-derived products have been derived from the original stomach tissue "without loss of potency", the present product is an activated product which has a higher potency than has a weight of original stomach-tissue material equal to that from which such activated product was derived, often several fold.

In this way, I am able to produce effective relief of certain anemias, especially pernicious anemia, by the oral administration of a daily dose of material derived from not to exceed 40 grams, and usually that derived from 12 to 25 grams, of the original stomach-tissue material, such as whole stomachs; in contrast to the daily dose necessary, in order to produce comparable results, of from 67 to 300 grams of original stomach tissue, or material derived from at least as much as 67 grams of original tissue with any previously known single-tissue-derived anti-anemia product, even the dried and defatted stomach-tissue products heretofore used in the treatment of pernicious anemia. The amount actually administered of my material, when in dry form, weighs less than 20%, and usually about 15%, of the original stomach-tissue material from which it is derived, so that my material derived from 40 grams of the original stomach-tissue material weighs about 6 grams, and that derived from 12 to 25 grams of original material weighs from about 1.8 to 3.75 grams; whereas the daily dose which it was necessary to administer of previous single-tissue-derived anti-anemia products in order to produce comparable results had a weight of the order of from 10 to 45 grams, and was derived from 67 to 300 grams of original stomach-tissue material.

The stomach-tissue material which I may use should include some or all of the lining of the pouch or central section of the stomach—the longitudinally intermediate portion which includes all of the fundus gland region with varying amounts and often the whole of the cardiac region and of the pyloric region. But the stomach lining alone, even of the pouch or central section, although it has an anti-anemia effectiveness by itself as has been shown by Sturgis and Isaacs and by Conner, does not by my treatment yield a product of the high anti-anemia potency which appropriate stomach-tissue material yields by such treatment. This difference may partly or wholly explain why the ordinary present-day commercial pepsin is substantially ineffective to relieve pernicious anemia, for such present-day commercial pepsin is a water-soluble extract derived by fluid-extraction from stomach-linings alone after they have been subjected to autolysis. My product has an exceptionally high peptic activity—ranging from 1:500 to 1:1600 or more—as well as a high potency in relieving pernicious anemia.

Because of the aforesaid situation about stomach lining, it is necessary for my invention to use more of the stomach than the mere lining or a portion of the lining thereof in order to get the high potency which I obtain. This may be done by using the whole stomach—which is a term of considerable inclusiveness, and means generally a whole thickness of stomach wall, and more particularly the entire pouch or central section of the stomach with varying amounts and often the whole of the cardiac and pyloric regions. In any case, in addition to the lining of the pouch or central section of the stomach, stomach-wall tissues other than the mucosa should also be used. This combination is what I mean by "appropriate stomach-tissue material" as used in this application.

In carrying out my invention, in the preferred method, I proceed as follows:

1. I use the appropriate stomach-tissue material in fresh condition, as soon as possible after the slaughter of the animals. I deem it preferable that after slaughter and before processing the stomach-tissue material shall not be allowed to remain for more than five or six hours at a temperature materially higher than freezing; as otherwise the yield of potent material is decreased.

2. I permit the fresh appropriate stomach-tissue material, after being washed and conveniently minced or ground, to undergo incipient digestion, so that there may be an interaction between substances present in it. Because the digestion is of that nature, and needs no added ferment or enzyme, I can properly call it self-digestion; even though, as noted below, I also add acid to obtain the desired hydrogen ion concentration. This self-digestion is preferably at a temperature around body temperature (98° F.), although some variation from body temperature is permissible, for a period which may vary over a considerable range but is desirably such that a digestion comparable to normal digestion in the living stomach is obtained. The higher the temperature should not be allowed to that the temperature should not be allowed to allowed for the incipient self-digestion. At body temperature, good results are obtained with digestion for from two to twelve hours. While undoubtedly longer periods can be effectively used, I deem it desirable that the total period between the slaughter of the animals and the end of the digestion shall not include more than eighteen (18) hours at which the material is at a temperature substantially above freezing. It is desirable that the temperature should not be allowed to exceed 115° F. at any time during or prior to the processing. The self-digestion is "incipient" in contradistinction to the full or complete digestion or autolysis which liquefies the whole mass, as has been done; for by maintaining the digestion incipient I produce very little if any liquefaction. I do not separate any liquid from the still substantially solid mass, but use the whole mass, save for the removal of water (by evaporation) and fats as noted below.

3. This self-digestion is best carried out u· de. acid conditions, desirably between pH 1 an pH 5.5, and conveniently at about pH 4.5 to pH 5. In obtaining the desired hydrogen ion concentration, I deem it desirable to add only acid, and to do so with care not to add too much acid.

4. The incipiently self-digested material is promptly dehydrated, at the end of the self-digestion period, desirably by evaporation in the absence of free access of air and at a temperature continuously kept below 115° F.; and preferably is also defatted. The removal of water and fat, of course, is a substantially universal procedure in the making of gland extracts. This dehydration is most conveniently done under high vacuum, such for instance as under an absolute pressure of a half-inch to one inch of mercury at a temperature not in excess of 115° F.; and I prefer that it be done at an absolute pressure of less than a half-inch of mercury at a temperature not in excess of 100° F. Subsequent to dehydration, it is desirable to defat, as by extracting the material thoroughly with petroleum ether.

This produces a solid product, sometimes more or less powdery but in any case one which can readily be ground to a powder. It has had nothing removed from the original stomach-tissue material with the exception of water and fat; and its weight is usually about 15% of that of the original stomach-tissue material from which it was derived. It is heat-labile—not fully stable when subjected to heat. Indeed, it is because of this heat-lability, which I think is mainly a lability of one component which enters into the activating reaction, that the temperature must be kept low during its making. It contains nitrogen. It is substantially insoluble in petroleum ether and in benzene; and also in acetone, alcohol, and ether. It is partially soluble in water, for about half of it will go into water solution; and that solution will usually contain about 3/4 or perhaps slightly more than 3/4 of the pernicious-anemia potency of the product. A suspension of it in distilled water has a hydrogen ion concentration of between pH 1 and pH 5.5, depending upon the hydrogen ion concentration which was obtained by the addition of acid in connection with the self-digestion.

The product thus obtained, ground if desired, is found to be very potent in the relief of certain anemias, especially pernicious anemia. It is effective in the majority of cases when orally administered in cases of pernicious anemia in daily doses of 6 grams (derived from about 40 grams of original material), and in most cases in daily doses of 1.8 to 3.75 grams (derived from 12 to 25 grams of original material), in contrast to the daily doses of several times that amount necessary of any single-tissue-derived material, from either stomach alone or liver alone, known prior to my present invention, and in contrast to the daily dose of from 67 (the minimum dose found among prior reports) to 300 grams which has been found necessary of untreated original stomach-tissue material. It may be administered in water or other liquid, but the weights given for the doses are dry weight, or weights of the solid product. When administered orally in the doses indicated to pernicious-anemia patients in relapse, the effects now recognized as characteristic of the effective treatment and of a satisfactory remission in pernicious anemia are obtained in the majority of cases. A fully satisfactory remission usually includes a sharp rise in reticulocytes between the fifth and twelfth days, followed by a fall in reticulocytes, the whole being accompanied by a gradual rise in the red-blood-cell count until the normal value of about five million is approached and often reached.

The B vitamins seem to help in many cases of anemia. My extract contains some of these vitamins from the original stomach-tissue material; but because of the small quantity of tissue material used for a dose, that amount of such vitamins is in some cases insufficient for best results. In those cases it is desirable that B vitamins in some form be added to my product. This may be done by adding them in any of the available forms, such as those derived from wheat embryos, rice polishings, or yeast. The amount of B vitamins so added may be varied as desired; but good results can be obtained by adding from 10 to 100 Sherman units per gram of my final product.

For somewhat similar reasons, it is desirable in many cases to add an iron salt to the final powder. This is especially desirable in cases where on treatment the hemoglobin increases at a lower rate than does the red-blood-cell count; as iron is an essential constituent of hemoglobin. Some iron, of course, comes from the original tissue, since it is present in all tissues; but this may not be sufficient because of the small quantity of original tissue represented in a dose of my product. The iron salt is desirably in the form of iron-ammonium citrate green, although other iron salts may be used.

Either the vitamin B or the iron salt may be added alone, or both may be added.

In making my anti-anemia material, I prefer to use all the steps noted, for best results. However, I do not regard all these steps as essential to my invention in its broad sense. The removal of water and fat is desirable to reduce the bulk and to improve the taste even if the material is to be used immediately, and to prevent the material from becoming rancid in case it is not to be used immediately, as is usually the case. All the steps noted are cumulative in their effects, to obtain high potency, stability, and palatability.

My process of producing a potent anti-anemia material is susceptible of considerable variation in detail. The following example shows one way of carrying out my invention to produce a highly potent material.

*Example*

100 pounds of fresh whole-hog-stomachs, emptied and cleaned, and embodying at least the pouch or central sections, are finely minced or ground, as by passing through a meat-grinder several times. To this is added sufficient hydrochloric acid to adjust the hydrogen ion concentration to about pH 4.5 to pH 5. This slightly acid material is thoroughly stirred, and allowed to undergo digestion for 2 to 4 hours at a temperature between 98° and 100° F., so that substances present in the material may interact. Immediately after the desired period of self-digestion, the incipiently self-digested material is dehydrated, in a vacuum drier, at an absolute pressure of 0.2 to 0.5 inch of mercury and a temperature under 100° F. The dehydrated material is then defatted, as with petroleum ether; and any residual petroleum ether is removed, as by drying.

The dehydrated and defatted material thus obtained from 100 pounds of original whole stomachs usually weighs about 15 pounds—less than one-fifth of the original whole stomachs. This material is a highly effective anti-anemia material embodying my invention, and may be orally administered directly in this form.

If desired, extracts may be made at any stage in the procedure, as by expression or water extraction. Such extracts have varying degrees of potency, although simple water extraction has given only relatively mediocre yields as compared with the unextracted material. These extracts, desirably after being reduced to a powder in vacuo at low temperature, may be administered as such.

Prior products have been made by the removal of water and/or fat from stomach-tissue material, with about the same concentration thereby in bulk and weight from the original stomach-tissue material as I get, or to about 15% by weight of the original stomach-tissue material. The difference between my product and these prior products is thus not in the mere matter of concentration in weight and/or in bulk, or in the greater removal of inert matter. The fundamental difference is that my process involves a definite activation or potentiation, in the incipient self-digestion or in the acid condition produced, or when both are used as is desirable; as a result of which my product, as distinguished from prior products which at best have suffered "no loss in potency," is more potent than a weight of original stomach-tissue material equal to that from which my product was derived.

I claim as my invention:

1. A potent anti-anemia product, comprising incipiently self-digested and dehydrated and defatted whole-stomach.

2. A potent anti-anemia product, comprising incipiently self-digested and dehydrated and defatted appropriate stomach-tissue material.

3. A potent anti-anemia product, comprising incipiently self-digested and dehydrated and defatted whole-stomach including the fundus gland region and at least substantial portions of the cardiac and pyloric regions.

4. A potent anti-anemia product, comprising an activated substance derived from stomach-tissue material, which product is heat-labile, contains nitrogen, is substantially insoluble in petroleum ether and in benzene, and when orally administered in cases of pernicious anemia in daily doses of material derived from between 12 and 40 grams of original stomach-tissue material is effective in the majority of such cases to produce the recognized symptoms characteristic of the relief of such cases.

5. A potent anti-anemia product, comprising an activated substance derived from stomach-tissue material, which product is heat-labile, contains nitrogen, is substantially insoluble in petroleum ether and in benzene, and when orally administered in cases of pernicious anemia in daily doses of material derived from 25 grams of original stomach-tissue material produces results which for their production with original stomach-tissue material require doses of from 67 to 300 grams.

6. A potent anti-anemia product, comprising an activated substance derived from stomach-tissue material, which product is heat-labile, contains nitrogen, is substantially insoluble in petroleum ether and in benzene, and when orally administered in cases of pernicious anemia in daily doses of six grams dry weight is effective in the majority of such cases to produce the recognized symptoms characteristic of the relief of such cases.

7. The process of producing a potent anti-anemia product from appropriate stomach-tissue material, which consists in subjecting such appropriate stomach-tissue material to incipient self-digestion, and dehydrating and defatting the resultant product.

8. The process of producing a potent anti-anemia product from appropriate stomach-tissue material, which consists in subjecting such appropriate stomach-tissue material to incipient self-digestion, and drying in the absence of free access of air at a temperature not above 115° F.

9. The process of producing a potent anti-anemia product from whole-stomach, which consists in subjecting such whole-stomach, including the fundus gland region and at least substantial portions of the cardiac and pyloric regions, to incipient self-digestion, and dehydrating and defatting the resultant product.

10. The process of producing a potent anti-anemia product from stomach-tissue material, which consists in subjecting the stomach-tissue material to incipient self-digestion under acid conditions at a temperature which does not exceed 115° F. and in the substantial absence of other tissue, and dehydrating.

11. An activated product derived from whole-stomach tissue; which product is heat-labile, contains nitrogen, is substantially insoluble in petroleum ether and benzene, has a peptic activity in excess of 1:500, and in daily oral doses of six grams dry weight is effective in the majority of pernicious-anemia cases to produce the recognized symptoms characteristic of the relief of such cases.

12. An activated product derived from appropriate stomach-tissue material; which product is heat-labile, contains nitrogen, is substantially insoluble in petroleum ether and benzene, has a peptic activity in excess of 1:500, and in daily oral doses of six grams dry weight is effective in the majority of pernicious-anemia cases to produce the recognized symptoms characteristic of the relief of such cases.

13. The process of producing a potent anti-anemia product from a stomach-tissue material, which consists in adding acid to such stomach-tissue material to produce a hydrogen ion concentration of between pH 1 and pH 5.5, and causing self-digestion to start by holding such so-treated stomach-tissue material for a period at a temperature which is conducive to self-digestion and which does not exceed 115° F. but dehydrating such stomach-tissue material before it has been allowed after slaughter to remain at a temperature materially above 98° F. for more than twelve hours.

GEORGE B. WALDEN.

CERTIFICATE OF CORRECTION.

Patent No. 2,020,267.  November 5, 1935.

GEORGE B. WALDEN.

It is hereby certified that error appears in the printed specification of the above numbered patent requiring correction as follows: Page 1, second column, line 3, for "Supplemental" read Supplement; line 32, after "ingredients" and before the period insert the words upon each other; page 2, second column, strike out line 21, and insert instead the syllable and words perature , the shorter the peroid which should be; and that the said Letters Patent should be read with this correction therein that the same may conform to the record of the case in the Patent Office.

Signed and sealed this 17th day of December, A. D. 1935.

(Seal)

Leslie Frazer
Acting Commissioner of Patents.